(12) United States Patent
Chi et al.

(10) Patent No.: US 8,645,469 B2
(45) Date of Patent: Feb. 4, 2014

(54) METHOD, APPARATUS AND COMPUTER PROGRAM PRODUCT FOR CONSTRUCTING TOPIC STRUCTURE IN INSTANCE MESSAGE MEETING

(75) Inventors: Chang Yan Chi, Beijing (CN); Tian Shu Wang, Beijing (CN); Wen Peng Xiao, HengYang (CN)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 12/025,020

(22) Filed: Feb. 2, 2008

(65) Prior Publication Data

US 2008/0189375 A1 Aug. 7, 2008

(30) Foreign Application Priority Data

Feb. 2, 2007 (CN) .......................... 2007 1 0006533

(51) Int. Cl.
*G06F 15/16* (2006.01)
(52) U.S. Cl.
USPC ........... 709/205; 709/204; 709/206; 709/207; 715/530; 715/733; 345/1.1
(58) Field of Classification Search
USPC ........... 709/332, 204–207; 707/513; 715/530, 715/733; 345/1.1
See application file for complete search history.

(56) References Cited

U.S. PATENT DOCUMENTS

| | | | | |
|---|---|---|---|---|
| 5,819,263 | A * | 10/1998 | Bromley et al. ...................... | 1/1 |
| 6,405,216 | B1 * | 6/2002 | Minnaert et al. ..................... | 1/1 |
| 6,901,519 | B1 * | 5/2005 | Stewart et al. .................. | 726/24 |
| 7,076,527 | B2 * | 7/2006 | Bellegarda et al. ........... | 709/206 |
| 7,603,408 | B1 * | 10/2009 | McGinnis et al. ............. | 709/203 |
| 7,668,922 | B2 * | 2/2010 | Garbow et al. ................ | 709/207 |
| 7,774,417 | B2 * | 8/2010 | Callanan et al. .............. | 709/206 |
| 7,930,350 | B2 * | 4/2011 | McConn et al. ............... | 709/206 |
| 2002/0029304 | A1 * | 3/2002 | Reynar et al. ................. | 709/332 |
| 2002/0198909 | A1 * | 12/2002 | Huynh et al. ................. | 707/513 |
| 2005/0235034 | A1 | 10/2005 | Chen et al. .................... | 709/206 |
| 2005/0267915 | A1 * | 12/2005 | Zhulong et al. ............... | 707/200 |
| 2006/0026252 | A1 * | 2/2006 | Caspi et al. ................... | 709/207 |
| 2006/0031367 | A1 * | 2/2006 | Buford et al. ................. | 709/207 |
| 2006/0288279 | A1 * | 12/2006 | Yacoub et al. ................. | 715/530 |
| 2007/0005701 | A1 * | 1/2007 | Barsness et al. .............. | 709/205 |
| 2007/0168448 | A1 * | 7/2007 | Garbow et al. ............... | 709/207 |
| 2008/0028031 | A1 * | 1/2008 | Bailey et al. .................. | 709/207 |

(Continued)

FOREIGN PATENT DOCUMENTS

| JP | 2000105731 | 4/2000 | ............. G06F 13/00 |
|---|---|---|---|
| JP | 2005084858 | 3/2004 | ............. G06F 13/00 |

(Continued)

*Primary Examiner* — Thu Ha Nguyen
(74) *Attorney, Agent, or Firm* — Ido Tuchman; William J. Stock (57) ABSTRACT

An instant messaging communication method, computer program product and apparatus. The instant messaging communication apparatus includes input means for inputting an instant message and a semantic tag for the instant message; a network module for transmitting the input instant message and semantic tag and receiving an instant message with a semantic tag; construction means for constructing a visual topic structural diagram of the transmitted and received instant messages according to the semantic tag; and display means for displaying the visual topic structural diagram. An embodiment of the communication apparatus provides structured guidance to the user's discussion, directs the user to make pertinent announcement and enables the user to easily sum up the main points of the discussion from the log through a visualized topic structural diagram.

21 Claims, 5 Drawing Sheets

(56) References Cited

U.S. PATENT DOCUMENTS

| | | | |
|---|---|---|---|
| 2008/0189375 A1* | 8/2008 | Chi et al. | 709/206 |
| 2009/0055187 A1* | 2/2009 | Leventhal et al. | 704/260 |
| 2009/0070128 A1* | 3/2009 | McCauley et al. | 705/1 |
| 2009/0070426 A1* | 3/2009 | McCauley et al. | 709/205 |
| 2009/0112683 A1* | 4/2009 | Hamilton et al. | 705/10 |
| 2009/0313334 A1* | 12/2009 | Seacat et al. | 709/206 |
| 2010/0306249 A1* | 12/2010 | Hill et al. | 707/769 |
| 2012/0065963 A1* | 3/2012 | Bangalore et al. | 704/9 |
| 2012/0150789 A1* | 6/2012 | Jhoney et al. | 706/52 |
| 2013/0198204 A1* | 8/2013 | Williams et al. | 707/748 |

FOREIGN PATENT DOCUMENTS

| | | | | |
|---|---|---|---|---|
| JP | 2004139229 | 5/2004 | | G06F 13/00 |
| JP | 2004145569 | 5/2004 | | G06F 17/21 |
| JP | 2005182154 | 7/2005 | | G06F 13/00 |

\* cited by examiner

(Prior Art)

Fig.5

(Prior Art)

METHOD, APPARATUS AND COMPUTER PROGRAM PRODUCT FOR CONSTRUCTING TOPIC STRUCTURE IN INSTANCE MESSAGE MEETING

CROSS-REFERENCE TO RELATED APPLICATIONS

This application claims priority under 35 U.S.C. §119 to Chinese Patent Application No. 200710006533.0 filed Feb. 2, 2007, the entire text of which is specifically incorporated by reference herein.

BACKGROUND OF THE INVENTION

The present invention generally relates to a computer network communication field, in particular to an Instant messaging communication method and apparatus.

With the development of computer network technology, an Instant messaging IM system has become a very popular tool for on-line chat and discussion. A lot of companies have developed different INSTANT MESSAGING software, for example, MSN™ Messger, Yahoo™ Messager, Google™ Talk, NetMeeting, Tencent QQ, Skype™, etc.

Generally, when the user is performing an instant messaging communication, a communication log arranged in time sequence will be displayed on an instant messaging client so as to prompt the contents of the conversation between users. Although the communication log arranged in a time sequence can reflect the history of the conversation between users, it has some defects. During chatting or discussion, only recording and displaying a linear log results in the lack of context relationships in the log. For example, when two users are chatting, the first user types quickly while the second user types slowly. In this case, the message log arranged in time sequence may possibly be as follows:

User A: Are you back today?
User A: Are you back alone?
User B: Yes.

Wherein, the user A asks two questions, when the second user only gives a simple answer "Yes", the first user does not know the second user's reply is directed to which question due to the lack of the context relationships.

In an instant messaging system that supports simultaneous conversation between a plurality of people, the situation becomes more complex. If the instant messages of all users are arranged in time sequence, with respect to an instant message sent from one user, it is hard for other users to tell with whom this user is discussing. When a plurality of topics are discussed simultaneously, the situation is more complex. The contents about all topics discussed by all users are mixed together.

Figure 5:
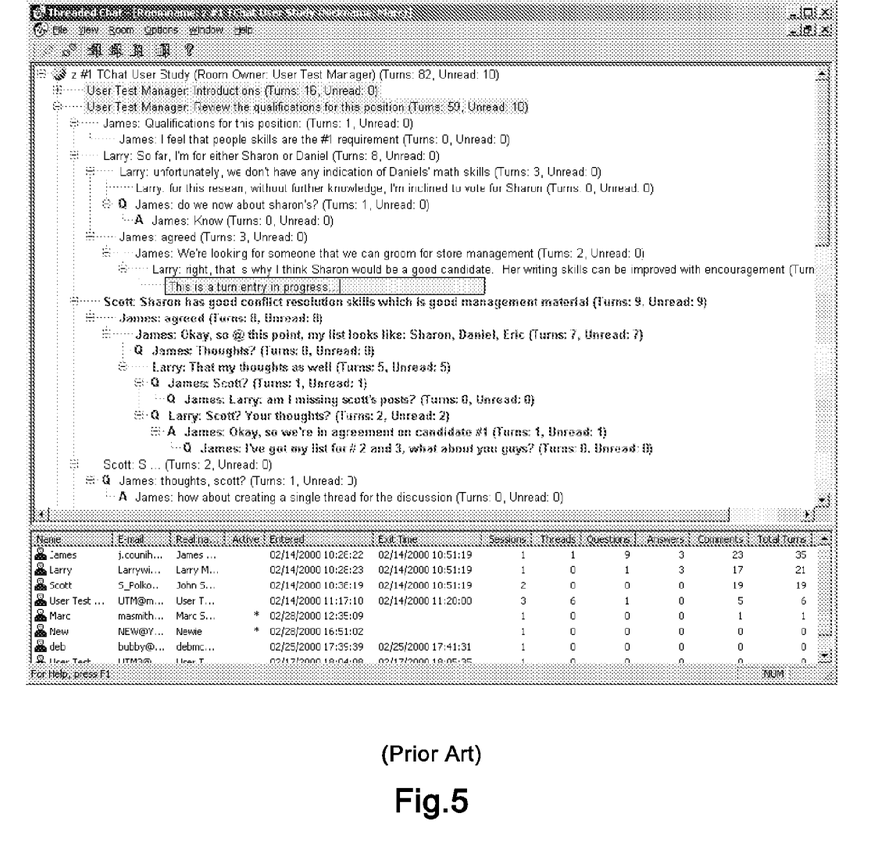
FIG. 5 is a user interface schematic diagram of a Threaded Chat instant messaging system.

Some instant messaging systems have already made some improvements in this regard. For such improved instant messaging systems, reference is made to Conversation Trees and Threaded Chats, Marc Smith, J J Cadiz and Byron Burkhalter, Jun. 20, 2000, Technical Report MSR-TR-2000-43. In this article, all conversions are organized in a tree-structure of occasion and reply. Such improvement enables the message log to reflect the object of the conversion. In addition, it adds a simple visualized mark to the contents according to the contents of conversation. FIG. 5 shows a user interface of the aforesaid instant messaging system. Although the aforesaid instant messaging system improves the arrangement manner of the message log, the contents in the same conversation clue are still arranged in time sequence. Such arrangement manner and marking manner still lack the structural information reflecting the contents of conversation, thereby it is impossible to direct the users to discuss the problems in a concentrated manner. In addition, due to the lack of context information and structural information, the users can hardly sum up the main points of the discussion from the log after the on-line discussion.

Figure 6:
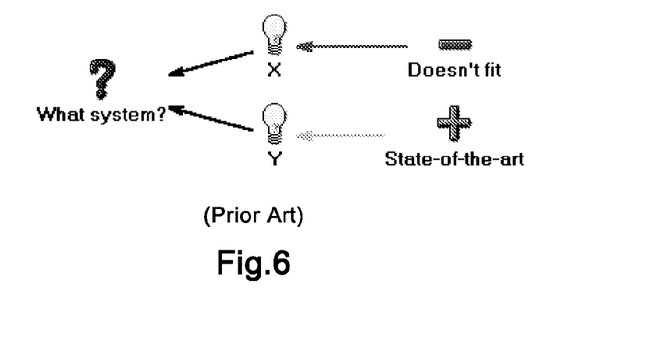
FIG. 6 is an example of IBIS chart.

An Issue Based Information System (IBIS) provides a clear structure for discussion and explanation of problems. With the aid of IBIS, the key logic elements of the contents of the discussion can be easily understood and shared. Usually, three core tags of the IBIS are Question, Ideal and Argument, wherein the Question tag indicates raising a problem, an Idea tag represents suggesting a solution to the problem, and the Argument tag represents the opinion or judgment supporting or opposite to an idea. In addition, an IBIS method usually further defines other tags, for example, pro and con tags are used to represent supporting and opposite to an argument, respectively. When the contents of discussion are illustrated with a visual IBIS tag icon, and after the logical relations between all tags are linked, an IBIS chart is thereby formed, as shown in FIG. 6. The IBIS chart can provide a clear structure to the people in discussion, and can facilitate summing up the contents of discussion or directing the people in discussion to discuss the relevant topics during the discussion.

BRIEF SUMMARY OF THE INVENTION

An object of the invention is to solve the problem that the aforesaid instant messaging system cannot direct the user to discussion and sum up the contents of discussion.

According to an aspect of the invention, an instant messaging communication method is provided, including the steps of inputting an instant message and a semantic tag of said instant message; transmitting the input instant message and semantic tag and receiving an instant message with a semantic tag; constructing a visual topic structural diagram of the transmitted and received instant messages according to the semantic tag; and displaying the visual topic structural diagram.

According to another aspect of the invention, an instant messaging communication apparatus is provided, including input means for inputting an instant message and a semantic tag for the instant message; a network module for transmitting the input instant message and semantic tag and receiving an instant message with a semantic tag; construction means for constructing a visual topic structural diagram of the transmitted and received instant messages according to the semantic tag; and display means for displaying the visual topic structural diagram.

According to a further aspect of the invention, an instant messaging communication apparatus is provided, including input means for inputting an instant message and a semantic tag for the instant message; a network module for transmitting the input instant message and semantic tag and receiving an instant message with a semantic tag; and display means for displaying the user-interactive user interface; wherein the display means is divided into a user input region, a flow-type log region and a visual topic structural region; wherein the user input region is used to input the instant message and the semantic tag of the instant message; the log region is used to display the instant message log in the log; and the visual topic structural region is used to display the visual topic structural diagram of the instant message in the log as constructed according to the semantic tag.

According to a further aspect of the invention, a machine-readable storage apparatus is provided, there is computer program stored thereon, and the computer program is executed by the machine, such that the machine is enabled to accomplish the aforesaid method.

Aspects of the present invention provide the user with a visual topic structural diagram, thereby directing the user to use an instant messaging system to discuss problems and sum up the contents of discussion.

Other characteristics and advantages of the invention will become obvious in combination with the description of accompanying drawings, wherein the same number represents the same or similar parts in all figures.

BRIEF DESCRIPTION OF THE SEVERAL VIEWS OF THE DRAWINGS

The figures form a part of the specification and are used to describe the embodiments of the invention and explain the principle of the invention together with the literal statement.

DETAILED DESCRIPTION OF THE INVENTION

The basic principle of the invention is to designate, when the user is performing an instant messaging communication, a semantic tag for an instant message to represent the contents of the message. A visual topic structural diagram of an instant message is constructed according to the semantic tag, thereby reflecting the contents of conversation in a visualized and structuralized manner, wherein the semantic tag may be a basic IBIS tag, and also other tags extended on the basis of the basic IBIS tag. For example, the tags such as time stamp and decision are added. In addition, the user self-defines semantic tags is also possible, as long as the semantic tag can characterize and organize the contents. Detailed description of the invention is made in combination with the following embodiments.

Figure 1A:
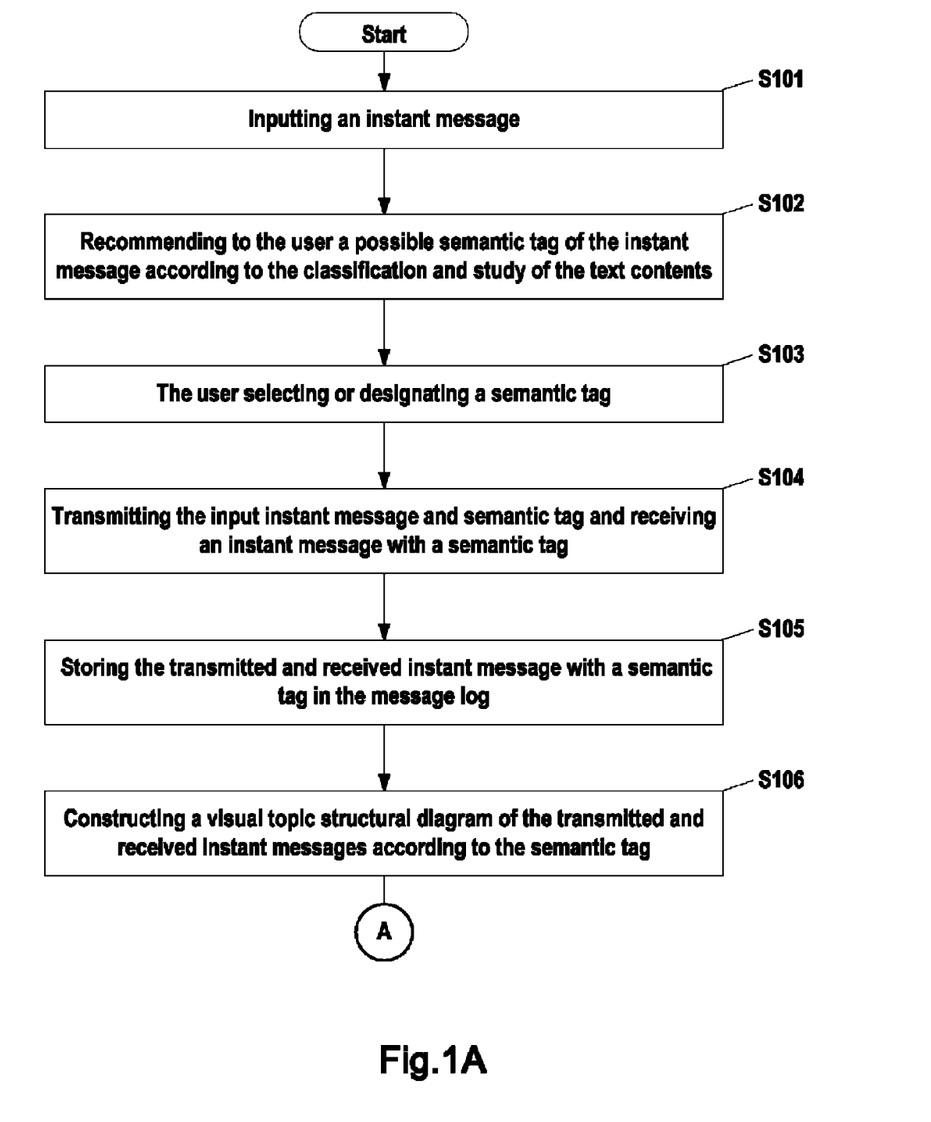
FIGS. 1A and 1B illustrate a flowchart of an instant messaging communication method according to an embodiment of the invention.
Figure 1B:
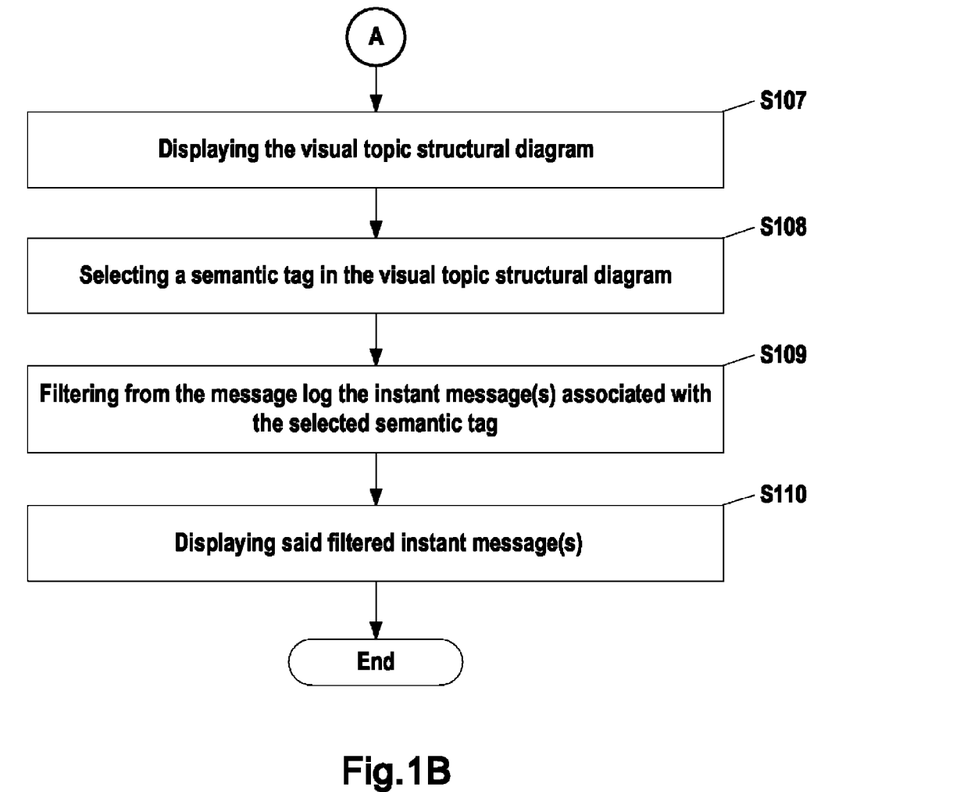

FIGS. 1A and 1B illustrate a flowchart of an instant messaging communication method according to an embodiment of the invention.

In step S101, the user inputs an instant message. Usually the user can input a text message via keyboard, certainly the instant message can be the message in other forms, for example, a message in a format and other audio, video segments or a computer file. It shall be appreciated that an instant message may be any message having contents when the user is discussing or chatting, the specific form of an instant message does not constitute the restriction of the invention.

Next, in step S102, the classification and study are performed according to the input contents, and possible semantic tags of the instant message are recommended to the user. The input contents are analyzed in an artificial intelligence manner, then the meaning of the contents is obtained. For example, it is analyzed whether there is "?" in the input text, if so, the semantic tag of the contents may be the question. If the input contents contain words like "reply", "answer", etc, the semantic tag of the contents may be "idea". Other methods of classifying and studying the contents are also well known, the present invention is not limited to specific classification and study methods of contents.

In addition, it shall be appreciated that step S102 is an alternative step. The present invention can directly perform the subsequent step S103 i.e. a semantic tag is directly designated without recommending to the user.

In step S103, the user selects the semantic tag recommended by the system or the user directly designates the semantic tag. For example, some icons of the semantic tags are set around the input block, the user may click one of these icons to indicate the semantic tag to which the input contents correspond, another possible way is to designate a semantic tag by clicking a hot key to which the semantic tag corresponds.

It shall be appreciated that the semantic tag may not be input during the conversation. The conversion to which no semantic tag is designated is deemed as the contents irrelevant to the present topic, and may not be added to the visual topic structural diagram. Thus, the topic structural diagram depicted according to the semantic tag can filter the irrelevant contents and facilitate the user summing up the main contents of the discussion.

Next, in step S104, transmit an input instant message and a semantic tag and receive the instant message with the semantic tag. There are various ways of transmitting instant messages and semantic tags, for example, after encoding the semantic tag into a special symbol, the special symbol is embedded into a header or tail of an instant message and transmitted together with the instant text message. In the case that the instant message is an audio video segment while the semantic tag is not convenient to be embedded in, the instant message may be transmitted first, and then an ID of the instant message and the semantic tag are sent to the receiver of the message. Likewise, there are also various corresponding ways of receiving the instant message with a semantic tag. Those ordinarily skilled in the art can adopt various methods of transmitting and receiving instant messages, this does not constitute the limitation of the invention.

In step S105, store the transmitted and received instant message with the semantic tag in a message log. The instant message may be stored in the log together with the tag, or the instant message and the semantic tag are stored separately. How to store the log and the medium for storing the log are well known and are no longer described currently. In addition, it shall be appreciated that storing the log of instant message is also an alternative step. For example, some instant messaging systems allow the user to select not to store the message log on the computer out of the reason of security or privacy.

In step S106, construct the visual topic structural diagram of the transmitted and received instant messages according to the semantic tag. There are various forms of visual topic structural diagrams, for example, a tree map, an IBIS chart, a mind map, etc. The present invention is not limited to the specific forms of the visual topic structural diagram, as long as the structural diagram can characterize and organize the contents of discussion for the user in a visualized manner.

There are various kinds of ways of realizing the visual topic structural diagram, and at present there are a lot of tools for realizing the IBIS chart and the mind map. One way is a manual way in which the user drags the icon of the semantic tag and designates the linking relation between all tags to organize a topic structural diagram. The topic structural diagram can also be generated in an automatic way. For example, after the user clicks a "question" icon in the topic structural diagram, the message next input by the user is set an "idea" tag automatically. After this message is transmitted, an "idea" icon is automatically added after the "question" icon of the topic structural diagram, and is automatically linked to the aforesaid "question" icon. The corresponding messages of these icons serve as the notes of the icons, thereby a visual topic structural diagram is automatically formed. In addition, through classification and study of the text contents, the relations between tags are analyzed automatically and a visual topic structural diagram is constructed.

After constructing a visual topic structural diagram, the visual topic structural diagram is displayed in step S107. The visual topic structural diagram can reflect the context relationships of discussion, for example, it may indicate clearly which question the user's answer is directed to. The visual topic structural diagram provides structuralized guide for the user's discussion, and directs the user to make pertinent announcement. In addition, the visual topic structural diagram enables the user to easily sum up the main points of the discussion from the log after on-line discussion.

After displaying the visual topic structural diagram, the following multiple alternative steps can be further carried out.

In a normal case, the note attached to the icon in the visual topic structural diagram is the contents of an instant message. Since said note is usually simple, it may possibly be only a part of the contents of the instant message and cannot reflect all contents of the discussion. Thus, all messages corresponding to this icon can be displayed through selecting a semantic tag icon, thereby reflecting completely the relevant contents of the discussion. The specific procedure is described as follows.

In step S108, select a semantic tag in the visual topic structural diagram, for example, clicking or double-clicking a semantic tag icon. In step S109, filter from the message log the instant messages associated with the selected semantic tag. There are various choices of filtering the corresponding instant messages, for example, click a "question" tag, then the messages corresponding to this tag and other messages linked to this question tag are filtered through. In this way, the relevant contents are filtered from the message log that is originally arranged in time sequence and is relatively confused in contents, and an instant message log can be organized according to the semantic structure so as to reflect completely the relevant contents of discussion. Another possibility is selecting an "argument" icon and all instant messages with the "argument" semantic tags are filtered through, this can reflect how many arguments support an idea. Or, selecting a "question" icon, and all instant messages with "question" semantic tags are filtered through, this can reflect how many questions have been discussed in total.

In step S110, display the filtered contents. There are various ways for doing this, one way is displaying the filtered messages in a flow type log region that originally displays the linear message log, another way is displaying the filtered messages in a separate focus log region.

In addition, the icons in the selected topic structural diagram can also represent that the current input contents or the contents to be input is directed to the message corresponding to this icon, and supply the input contents or the contents to be input with the corresponding semantic tag.

Figure 2:
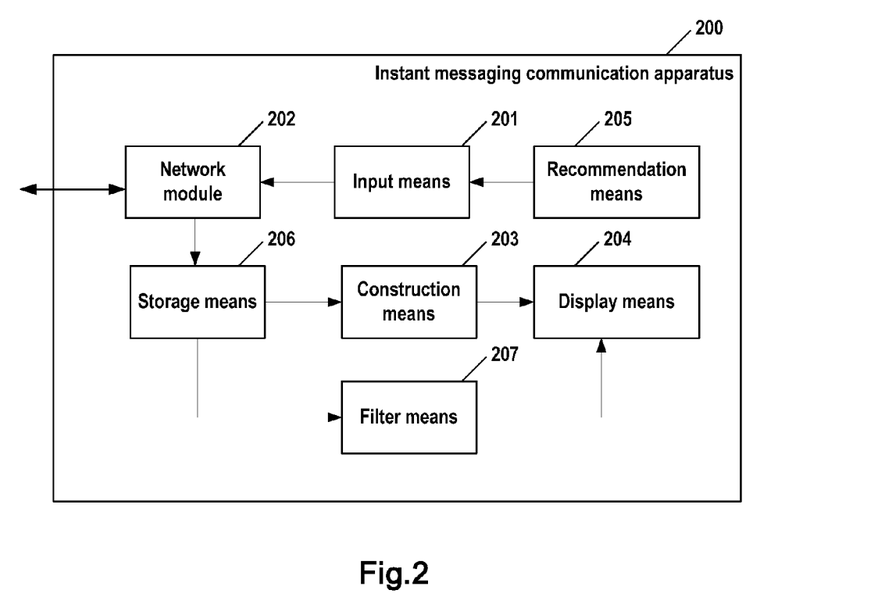
FIG. 2 is a structural block diagram of an instant messaging communication apparatus according to an embodiment of the invention.

FIG. 2 is a structural block diagram of an instant messaging communication apparatus according to an embodiment of the invention. The instant messaging communication apparatus 200 of the invention comprises an input means 201, a network module 202, a construction means 203 and a display means 204. The instant messaging communication apparatus 200 may further comprise recommendation means 205, storage means 206 and filter means 207.

The input means 201 is used to input an instant message and the semantic tag of the instant message. The input means 201 may be a keyboard, a handwriting board, a mouse, a microphone, etc. for inputting text contents or other multimedia contents.

In addition, the input means 201 can be further used to input the semantic tag to which the instant message corresponds. For example, clicking the icon to which the semantic tag corresponds or clicking the corresponding hot key to input the semantic tag. Alternatively, the recommendation means 205 performs contents classification and study of the instant messages input by the input means 201 and recommends to the user the possible semantic tags. The user may select the semantic tag through the input means 201.

The network module 202 is used to transmit the instant message and the semantic tag that are input by the input means 201 to other users and receive the instant message with the semantic tag transmitted by other users. It shall be appreciated that the network module 202 can be various network modules capable of exchanging information with other computers or electronic devices. The present invention can be applied in various network environments, for example, an Internet, local region network, wireless local region network, telecommunication network, etc.

Construction means 203 is used to construct, according to the semantic tag, a visual topic structural diagram of the instant message in the log. The construction means 203 may construct an icon according to the user's action of dragging the semantic tag icon, and may also construct a visual topic structural diagram according to the linking relationships of the icons per se and the linking relationships between icons as determined by text contents classification and study. Display means 204 is used to display the visual topic structural diagram that is constructed by means 203.

The instant messaging communication means 200 can further comprise storage means 206 for storing the semantic tags that corresponds to the transmitted and received instant messages. The storage means 206 may be any type of memories and storage mediums for storing information.

Filter means 207 can filter the instant messages stored in the storage means 206 according to the semantic tag selected by the user. After the instant messages associated with the semantic tag selected by the user are filtered through by the filter means 207, the display means 204 displays this part of log in the flow type log region or focus log region.

Figure 3:
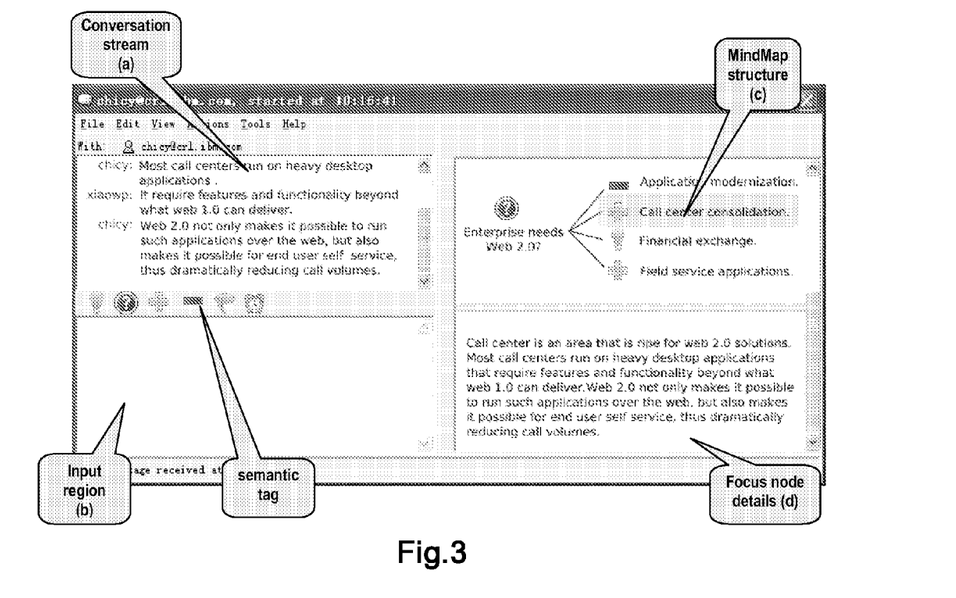
FIG. 3 is a user interface schematic diagram of an instant messaging communication client according to an embodiment of the invention.

FIG. 3 is a user interface schematic diagram of an instant messaging communication client according to an embodiment of the invention. In this exemplary user interface, the display is divided into a user input region, a flow type log region, a focus log region and a visual topic structural region. The user input region is used to input an instant message and the semantic tag of the instant message; a flow type log region is used to display the message log arranged in time; the focus log region is used to display the instant message log that is filtered according to the semantic log; and the visual topic structural region is used to display the visual topic structural diagram of the instant messages in the log as constructed according to the semantic log. Certainly, a log region can also be adopted to display the message log arranged in a time sequence or display the filtered message log.

Figure 4:
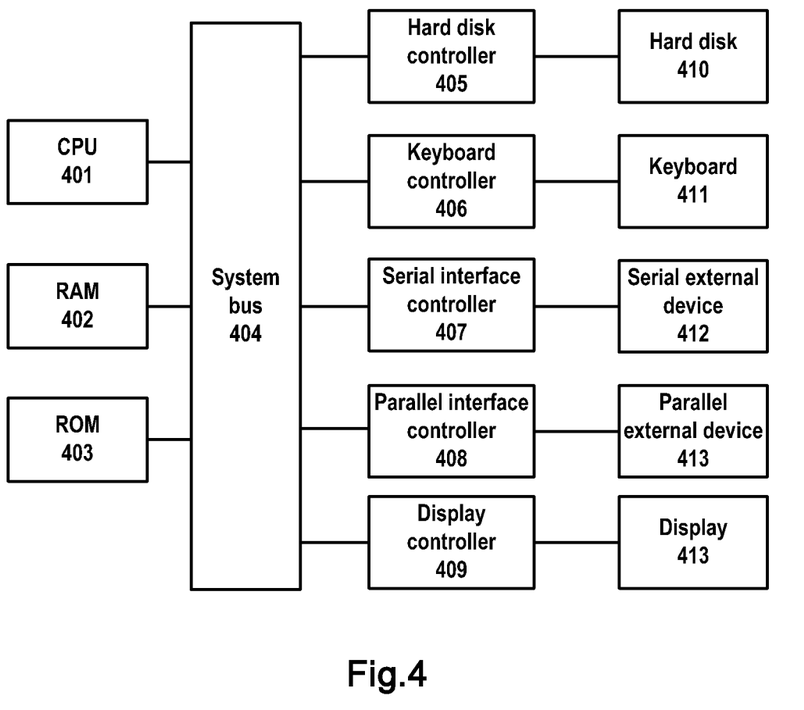
FIG. 4 is a structural schematic diagram of a computer adapted to realize the instant messaging communication apparatus of the invention.

FIG. 4 schematically shows a computer system in which the embodiments according to the present invention can be implemented. The computer system shown in FIG. 4 comprises a CPU (Central Processing Unit) 401, a RAM (Random Access Memory) 402, a ROM (Read Only Memory) 403, a system bus 404, a HD (Hard Disk) controller 405, a keyboard controller 406, a serial interface controller 407, a parallel interface controller 408, a display controller 409, a hard disk 410, a keyboard 411, a serial external device 412, a parallel external device 413 and a display 414. Among these components, connected to system bus 404 are CPU 401, RAM 402, ROM 403, HD controller 405, keyboard controller 406, serial interface controller 407, parallel interface controller 408 and display controller 409. Hard disk 410 is connected to HD controller 405, and keyboard 411 to keyboard controller 406, serial external device 412 to serial interface controller 407, parallel external device 413 to parallel interface controller 408, and display 414 to display controller 409.

The functions of each component in FIG. 4 are well known in the art, and the architecture shown in FIG. 4 is conventional. Such an architecture applies to not only personal computers but also handheld devices such as Palm PCs, PDAs (personal data assistants), mobile telephones, etc. In different applications, some of the components shown in FIG. 4 may be omitted. The whole system shown in FIG. 4 is controlled by computer readable instructions, which are usually stored as software in hard disk 410, EPROM or other non-volatile memory. The software can also be downloaded from the network (not shown in the figure). The software, either saved in hard disk 410 or downloaded from the network, can be loaded into RAM 402, and executed by CPU 401 for implementing the functions defined by the software.

As the computer system shown in FIG. 4 is able to support the URL testing method and the scenario testing method according to the present invention, the computer system merely serves as an example of computer systems. Those skilled in the art may understand that many other computer system designs are also able to carry out the embodiments of the present invention.

The present invention may further be implemented as a computer program product used by, for example the computer system shown in FIG. 4, which contains code for implementing the URL testing method and the scenario testing method according to the present invention. The code may be stored in a memory of other computer system prior to the usage. For instance, the code may be stored in a hard disk or a removable memory like an optical disk or a floppy disk, or may be downloaded via the Internet or other computer network.

The disclosed methods of the present invention may be implemented by software, hardware or a combination thereof. The hardware part can be implemented by using a special logic, and the software part can be stored in a memory and executed by an appropriate instruction execution system, such as a microprocessor, a personal computer (PC) or a mainframe.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

That which is claimed is:

1. An instant messaging communication method, comprising:
    inputting a first instant message and a first semantic tag of said instant message;
    encoding the first semantic tag in one of a header and a tail of the first instant message;
    transmitting the first instant message with the encoded first semantic tag;
    receiving a second instant message with a second semantic tag encoded in one of a header and a tail of the second instant message;
    constructing a visual topic structural diagram of the transmitted and received first and second instant messages according to the first and second semantic tags; and
    displaying the visual topic structural diagram.

2. The method according to claim 1, further comprising:
    storing the transmitted and received first and second instant messages in a log;
    selecting a selected semantic tag in a visual topic structural diagram; and
    filtering from the log instant messages associated with the selected semantic tag.

3. The method according to claim 2, further comprising:
    displaying said filtered instant messages in a separate display region.

4. The method according to claim 1, wherein inputting the semantic tag of the instant message further comprises:
    designating the first semantic tag for the first instant message by an instant messaging user.

5. The method according to claim 1, wherein the step of inputting the semantic tag of the instant message further comprises:
    recommending to an instant messaging user possible semantic tags of the first instant message according to classification and study of the first instant message's text contents, the instant messaging user selecting the first semantic tag therefrom.

6. The method according to claim 1, wherein the semantic tag is one of a basic Issue Based Information System (IBIS) tag and a user self-defined semantic tag.

7. The method according to claim 1, wherein the visual topic structural diagram is one of an Issue Based Information System (IBIS) chart, a mind map and a tree map.

8. An instant messaging communication apparatus, comprising:
    a central processing unit;
    an input unit for inputting a first instant message and a first semantic tag for the instant message;
    a network module for transmitting the first input instant message with the first semantic tag encoded in one of a header and a tail of the first instant message, and receiving a second instant message with a second semantic tag encoded in one of a header and a tail of the second instant message;
    a construction unit for constructing a visual topic structural diagram of the transmitted and received first and second instant messages according to the first and second semantic tags; and
    a display unit for displaying the visual topic structural diagram.

9. The apparatus according to claim 8, further comprising:
    a storage unit for storing the transmitted and received first and second instant messages with semantic tags in a message log;
    the input unit further for selecting a semantic tag in a visual topic structural diagram; and
    a filter unit for filtering from the message log the instant message(s) associated with the selected semantic tag.

10. The apparatus according to claim 9, said display unit further displays said filtered instant messages in a separate display region.

11. The apparatus according to claim 8, wherein the input unit is further configured to designate the first semantic tag of said first instant message.

12. The apparatus according to claim 8, further comprising:
recommendation unit for recommending to an instant messaging user possible semantic tags of the first instant message according to classification and study of the first instant message's text contents, instant messaging the user selecting the first semantic tag therefrom.

13. The apparatus according to claim 8, wherein the semantic tag is one of a basic Issue Based Information System (IBIS) tag and a user self-defined semantic tag.

14. The apparatus according to claim 8, wherein the visual topic structural diagram is one of an Issue Based Information System (IBIS) chart, a mind map and a tree map.

15. An instant messaging communication apparatus, comprising:
a central processing unit;
an input unit for inputting a first instant message and a first semantic tag for the instant message;
a network module for transmitting the input first instant message with the first semantic tag encoded in one of a header and a tail of the first instant message, and receiving a second instant message with a second semantic tag encoded in one of a header and a tail of the second instant message; and
a display for displaying a user-interactive user interface, the display being divided into a user input region, a log region and a visual topic structural region; the user input region configured to input the first instant message and the first semantic tag of the first instant message; the log region configured to display an instant message log; and the visual topic structural region configured to display a visual topic structural diagram of the first and second instant messages in the instant message log as constructed according to the first and second semantic tags.

16. The apparatus according to claim 15, wherein the display displays in the log region, after the user selects the first semantic tag in the visual topic structural diagram, instant messages filtered from the instant message log that are associated with the selected first semantic tag.

17. The apparatus according to claim 15, wherein the display is further provided with a focus log region, after the user selects the first semantic tag in the visual topic structural diagram, the display displays, in the focus log region, the instant messages filtered from the message log that are associated with the selected first semantic tag.

18. A computer program product embodied in non-transitory computer readable memory comprising:
computer readable program codes coupled to the computer readable memory for communicating instant messages, the computer readable program codes configured to cause the program to:
input a first instant message and a first semantic tag of said instant message;
encode the first semantic tag in one of a header and a tail of the first instant message;
transmit the first instant message with the encoded first semantic tag;
receive a second instant message with a second semantic tag encoded in one of a header and a tail of the second instant message;
construct a visual topic structural diagram of the transmitted and received first and second instant messages according to the first and second semantic tags; and
display the visual topic structural diagram.

19. The method according to claim 1, further comprising selecting the first semantic tag from a plurality of displayed icons representing different semantic tags.

20. The method according to claim 1, wherein the first semantic tag indicates the semantic meaning content of the first instant message.

21. The method according to claim 1, wherein the visual topic structural diagram is displayed in a visual topic structural region of a user interface, the user interface including a user input region to input instant messages and semantic tags of the instant messages, a flow type log region to display a message log arranged in time, a focus log region to display the instant message log filtered according to the semantic logs, and a visual topic structural region to display the visual topic structural diagram.

* * * * *